United States Patent [19]

Haven

[11] Patent Number: 4,572,592
[45] Date of Patent: Feb. 25, 1986

[54] REMOVABLE DISPLAY SCREEN BEZEL

[75] Inventor: Kenneth R. Haven, Fremont, Calif.

[73] Assignee: Hewlett-Packard Company, Palo Alto, Calif.

[21] Appl. No.: 628,882

[22] Filed: Jul. 9, 1984

[51] Int. Cl.$^4$ ...................... A47B 81/06; H04N 5/645
[52] U.S. Cl. .................................... 312/7.2; 358/248; 358/254
[58] Field of Search ...................... 358/248, 254, 249; 312/7.2, 257 A

[56] References Cited

U.S. PATENT DOCUMENTS

| 2,870,438 | 1/1959 | Solheim | 358/248 |
| 3,294,905 | 12/1966 | Jonassen | 312/7.2 |
| 3,703,323 | 11/1972 | Gallas et al. | 312/7.2 |
| 4,063,289 | 12/1977 | Veenendall | 358/248 |

Primary Examiner—Edward L. Coles, Sr.
Attorney, Agent, or Firm—Jeffery B. Fromm

[57] ABSTRACT

An easily removable video display bezel for facilitating the easy and quick removal of the bezel from the display screen. The bezel, when attached, fits tightly around the display screen and serves to frame the image on the screen.

10 Claims, 8 Drawing Figures

REMOVABLE DISPLAY SCREEN BEZEL

BACKGROUND OF THE INVENTION

This invention relates to video display bezels, and more particularly to a bezel which can be quickly and easily removed by a user or service technician.

The user of a video display device, usually a cathode ray tube, may be required to remove the bezel which frames the display screen. Such a situation might arise for any number of reasons. The user may desire to place or remove a filter between the bezel and the screen. Similarly, the advent of computer touchscreen technology gives the user of a computer video display the option of installing a touchscreen device by installing a special touchscreen bezel unit. Thus the need for a bezel which can be quickly and easily removed and replaced has arisen within the video display industry.

To date, a bezel could not be removed without considerable effort. Design constraints require that a bezel accommodate the varying tolerances in screen dimensions incurred in the manufacturing process. It is also desirable that the bezel fit tightly around the display screen face.

In the prior art the bezel has been seated against the video display screen from behind the screen itself. Screws are used to attach the bezel to the display frame. The screws are tightened such that the bezel plastically deforms to accommodate the dimensions of the cathode ray tube and simultaneously seals off the face of the cathode ray tube. Such a configuration is costly and makes removal and replacement of the bezel quite difficult.

Another prior approach uses shims to mount the cathode ray tube so that the screen itself is positioned against a bezel molded directly to the display housing. While this arrangement is not as costly as the method using screws, removal and replacement of the bezel is again not easily or quickly achieved.

Other designs have simply allowed the face of the screen to remain unsealed leaving a gap between the edge of the bezel and the display screen face. This has proven undesirable because the bezel does not protect the electronics inside of the display against contamination such as by liquid spills. Furthermore, in systems where the cathode ray tube is internally cooled by means of convection, the absence of a seal on the face of the cathode ray tube allows leakage of the cooling air through unwanted paths.

SUMMARY OF THE INVENTION

The present invention provides an arrangement in which the user can quickly and easily remove the bezel sealing the video display screen without using any external mechanical tools or devices. The preferred embodiment of the invention comprises a frame, a bezel having a specially designed protrusion, a pair of guidetracks, a retaining clip to engage the protrusion, and a spring used to urge the bezel into position. The bezel accommodates the video display, which in its preferred embodiment, is a cathode ray tube.

The present invention provides an expedient, efficient, and simple means by which a video display bezel can be removed without the use of additional tools or disassembly of the video display housing. Hence modification of the display screen is simple and inexpensive.

DESCRIPTION OF THE PREFERRED EMBODIMENT

Figure 1:
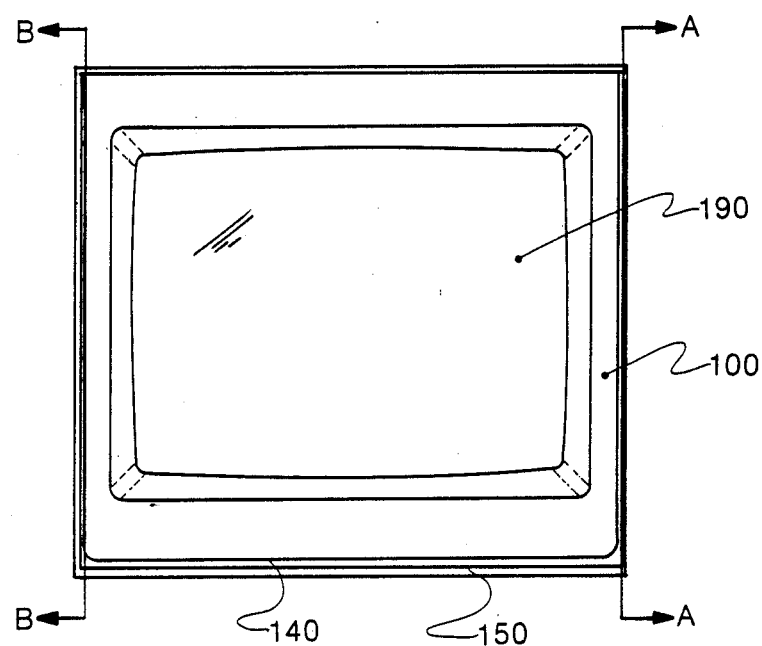
FIG. 1 is a front view of the preferred embodiment of the invention.

FIG. 1 shows a front view of the preferred embodiment of the invention.

Figure 2:
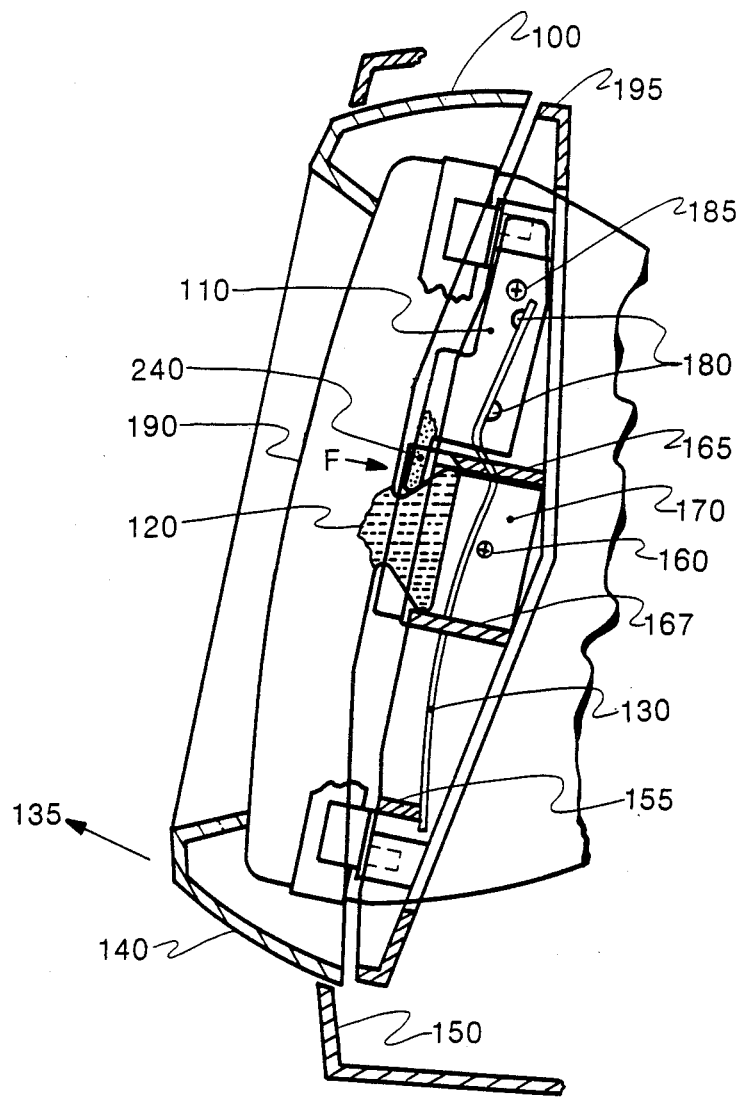
FIG. 2 is a cross-sectional side view taken along line A—A in FIG. 1.

Referring to the cross-sectional side view of FIG. 2, there is shown a frame 195, a chassis 150, a cathode ray tube display screen 190, a bezel 100, a pair of guide tracks 165 and 167, a single alignment plane 170, a retaining clip 110, and a spring 130. Shaded portions indicate a cross-sectional view when cross-hatched and are for emphasis only when double cross-hatched.

Figure 3:
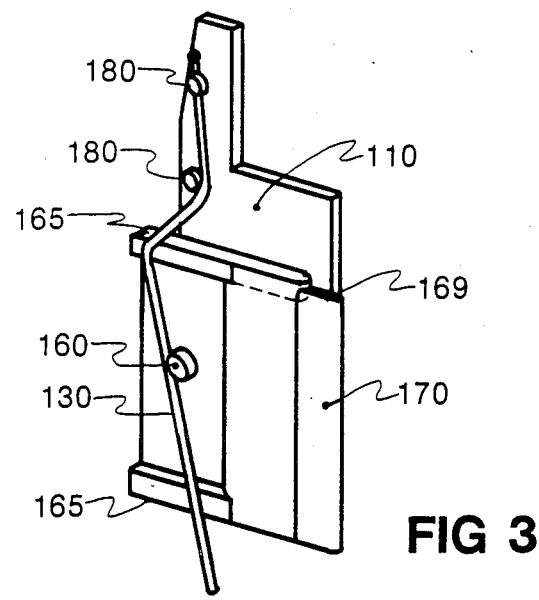
FIG. 3 is a detailed perspective view of a portion of the preferred embodiment shown in FIG. 2.

The frame 195 and the alignment plane 170 are attached to the chassis 150 by a screw 160. The frame 195 supports and properly positions the cathode ray tube 190 at the desired location relative to the chassis 150. Pivotally affixed to the frame 195 by means of a screw 185 is the retaining clip 110 having a pawl 240 fashioned in molded plastic. The guide tracks 165 and 167 are molded to the frame 195 immediately adjacent the clip 110. The alignment plane 170, shown in detail in FIG. 3, is made of sheet metal and is bent such that it can be affixed between the guidetracks 165 and 167 to the frame 195 by means of the screw 160. The leading edge 169 of the alignment plane 170 has been folded back as shown in FIG. 3.

Referring again to FIG. 2, there is shown the spring 130 affixed to the retaining clip 110, by means of two slotted tension retainers 180 attached to the clip 110, and to the frame 195, by a retainer 155 affixed to the frame 195. The bezel 100 is molded in plastic and has a protrusion 120 molded to its edge in the manner shown in FIG. 2. The protrusion 120 is engaged by the pawl 240. The spring 130 attached to the retaining clip 110 provides a resilient bias necessary to exert a net force, F, of approximately five pounds to urge the bezel 100 into engagement with the display screen 190. The bezel 100 is positioned with respect to the display screen 190 by the guidetracks 165 and 167 and the alignment plane 170.

Figure 4:
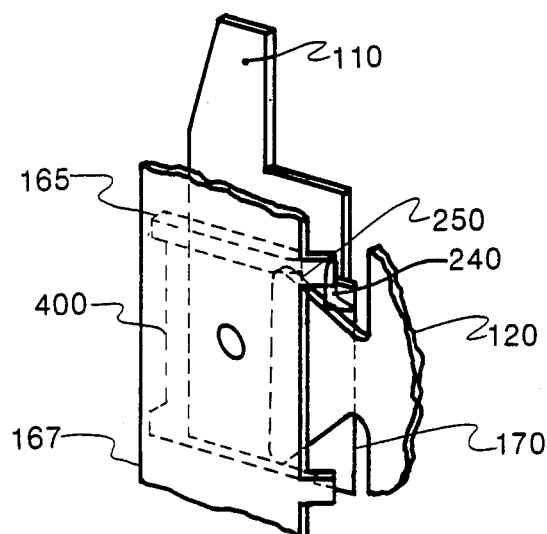
FIG. 4 is a detailed perspective view of an opposite side of the same portion of the preferred embodiment shown in FIG. 2.
Figure 5:
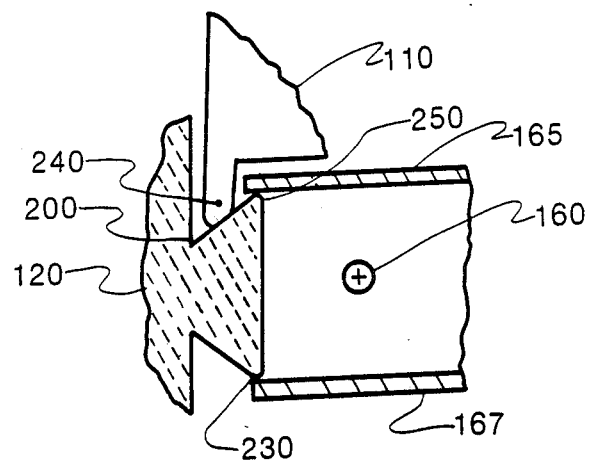
FIG. 5 is an enlarged cross-sectional view of a portion of FIG. 1.

FIG. 4 shows the location of the protrusion 120 between the tracks 165 and 167 when the bezel 100 is in place. FIG. 5 shows an enlarged cross section of the bezel protrusion 120. The pawl 240 on the clip 110 engages the protrusion 120 at any point between areas 200 and 250. The distal extremes 250 and 230 of the protrusion 120 are in contact with the guide tracks 165 and 167 respectively to assure proper alignment between the bezel 100 and the frame 195 as shown in FIG. 2.

Referring again to FIG. 1, a mirror-imaged configuration of the apparatus as above described is likewise situated along line B—B.

Figure 6:
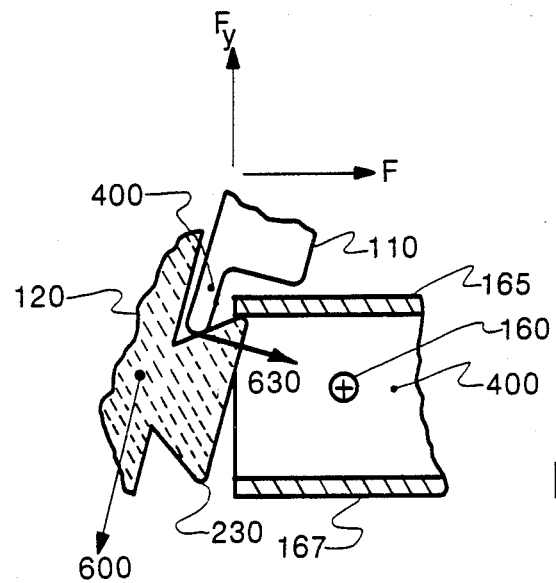
FIG. 6 is an enlarged cross-sectional view of portion of FIG. 1 showing the configuration as the bezel initially disengages a guidetrack.
Figure 7:
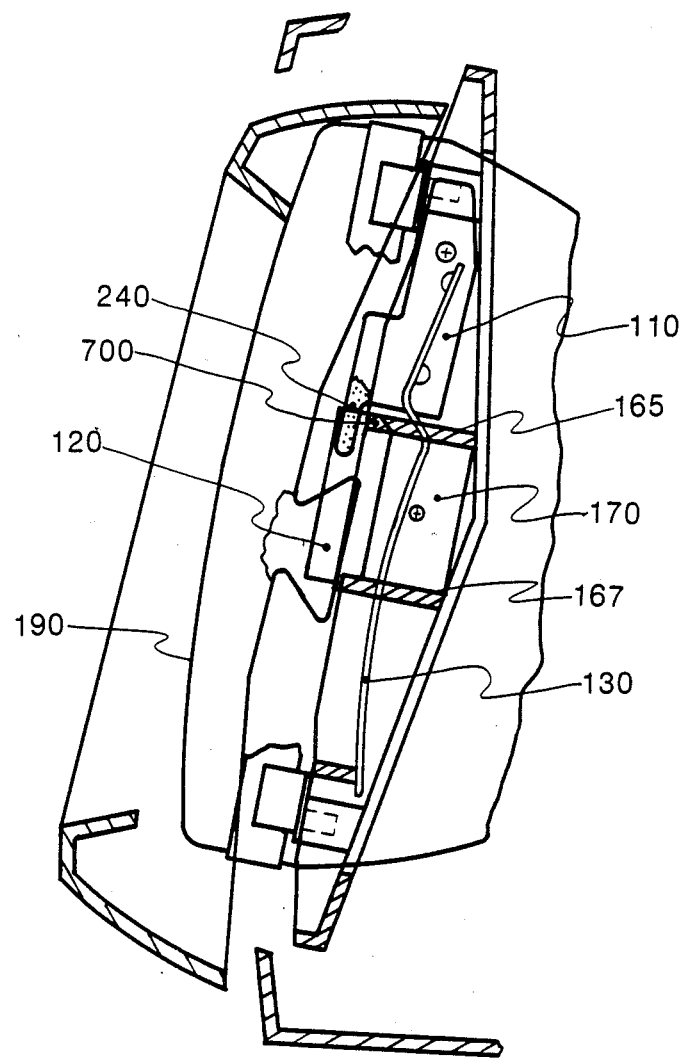
FIG. 7 is a cross-sectional side view taken along line A—A in FIG. 1 showing the present apparatus after the bezel has been completely disengaged, but not yet removed.
Figure 8:
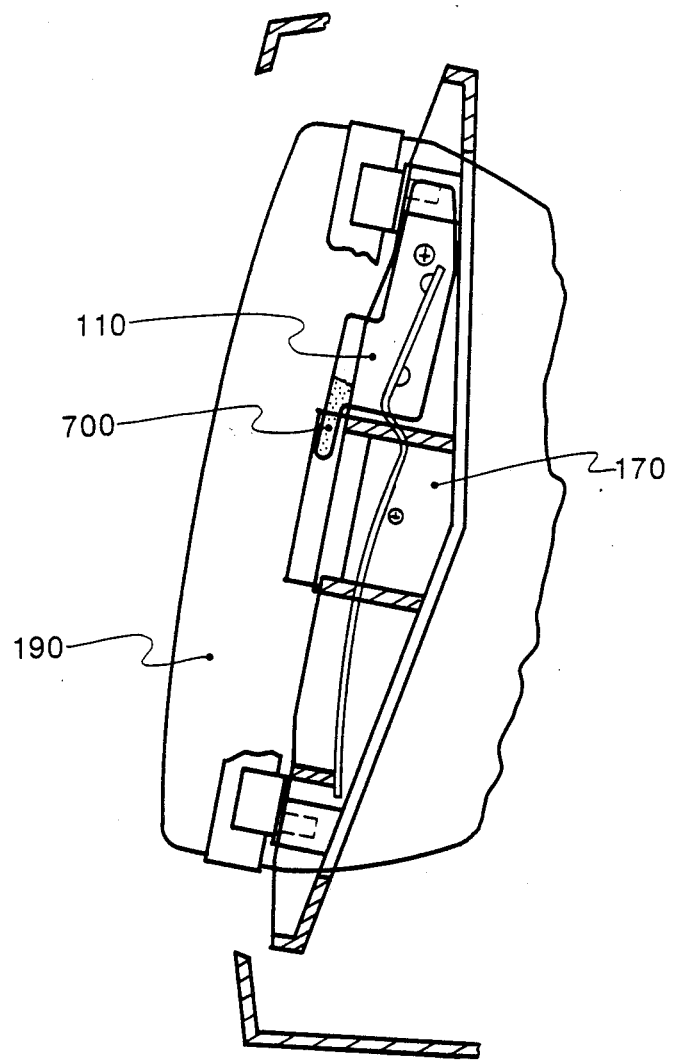
FIG. 8 is a cross-sectional side view taken along line A—A in FIG. 1 showing the present apparatus after the bezel has been completely disengaged and removed.

When removal or disengagement of the bezel 100 shown in FIG. 1 is desired, a user grasps the bezel 100 along the edge 140 and gently pulls the bezel 100 outwardly away from the display screen 190 in the direction 135, shown in FIG. 2. As the bezel 100 is further displaced in direction 135, the protrusion 120 will disengage from the guidetrack 167 as shown in FIG. 6. The distal extreme 230 of the protrusion 120 will become completely disengaged from the guidetrack 167. When the distal extreme 230 is fully disengaged from guide track 167, the clip 110 will apply a component of the five pound net engaging force F upon the protrusion 120 in the direction of the vector 630 depicted in FIG. 6. The application of such an inward force vector 630 will result in movement of the entire bezel 100 in the direction of the arrow 600. FIG. 7 shows the configuration after the protrusion 120 moves completely away from the guidetracks 165 and 167. The clip 110 will move back against the guidetrack 165 under bias from spring 130 and be restrained from any further motion at point 700. When this occurs, the bezel 100 will be fully disengaged from the guide tracks 165 and 167 The bezel 100 can then be completely removed by simply pulling it outward, leaving the screen 190 completely exposed as shown in FIG. 8.

To reengage the bezel 100 the process is essentially reversed. The bezel 100 is roughly aligned with the display screen 190. This is accomplished, as FIG. 4 illustrates, such that the protrusion 120 is sandwiched between the alignment plane 170 and the frame wall 400. The user then engages the protrusion 240 of the clip 110 with the upper distal extreme 250 of the protrusion 120. Having done so, the application of a gentle upward force, $F_y$ will cause the clip 110 to apply the inward engaging force, as represented by the vector 630 in FIG. 6. The entire bezel 100 is then automatically pulled and brought into position and alignment as shown in FIG. 1.

I claim:

1. A removable bezel apparatus for a display screen comprising:
   a frame;
   a first member disposed to abut the display screen including a protrusion having distal and proximal extremes, said distal extreme forming a monotonically increasing curve with the proximal extreme;
   a second member, mounted on said frame, having two parallel guides spaced apart a distance approximately equal to distal extreme of said protrusion on the first member, said protrusion on the first member being slideably engageable with said guides;
   a third member pivotally mounted on said frame in releaseable engagement with said protrusion at said proximal extreme; and
   a fourth means, mounted on said frame between said guides of said second member, disposed orthogonally therein, said protrusion on the first member being slideably engageable with said fourth member;
   a resilient means coupled from said frame to the third member for engaging said protrusion of the first member and urging into position the first member against the display screen.

2. An apparatus as in claim 1 wherein said frame is disposed to support the display screen.

3. An apparatus as in claim 1 wherein said protrusion is substantially trapezoidal in cross section with a minor base and a major base and said minor base being affixed to said first member.

4. An apparatus as in claim 1 further comprising two pairs of guides, each of said pairs of guides being oppositely mounted on the frame; and further comprising two protrusions on the first member each being slideably engageable with one of said pairs of said protrusions and said guides.

5. An apparatus as in claim 4 wherein each of said protrusions is substantially a trapezoidal in cross section with a minor base and a major base and said minor base being affixed to said first member.

6. An apparatus as in claim 2 further comprising two pairs of guides, each of said pairs of guides being oppositely mounted on the frame; and further comprising two protrusions on the first member each being slideably engageable with one of said pairs of said guides.

7. An apparatus as in claim 6 wherein each of said protrusions is substantially trapezoidal in cross section with a minor base and a major base and said minor base being affixed to said first member.

8. An apparatus as in claim 1 wherein the resilient means comprises a spring.

9. An apparatus as in claim 8 wherein said spring exerts a bias of approximately 5 pounds of force in engaging the first member against the display screen.

10. An apparatus as in claim 1 wherein the maximum travel of said third member is restrained by abutting engagement with the second member.

* * * * *